(No Model.) 6 Sheets—Sheet 1.
D. H. DORSETT, J. E. MORRIS & B. WILLIAMS.
APPARATUS FOR MOLDING THE SECTIONS OF ELECTRICAL CONDUITS
No. 291,996. Patented Jan. 15, 1884.
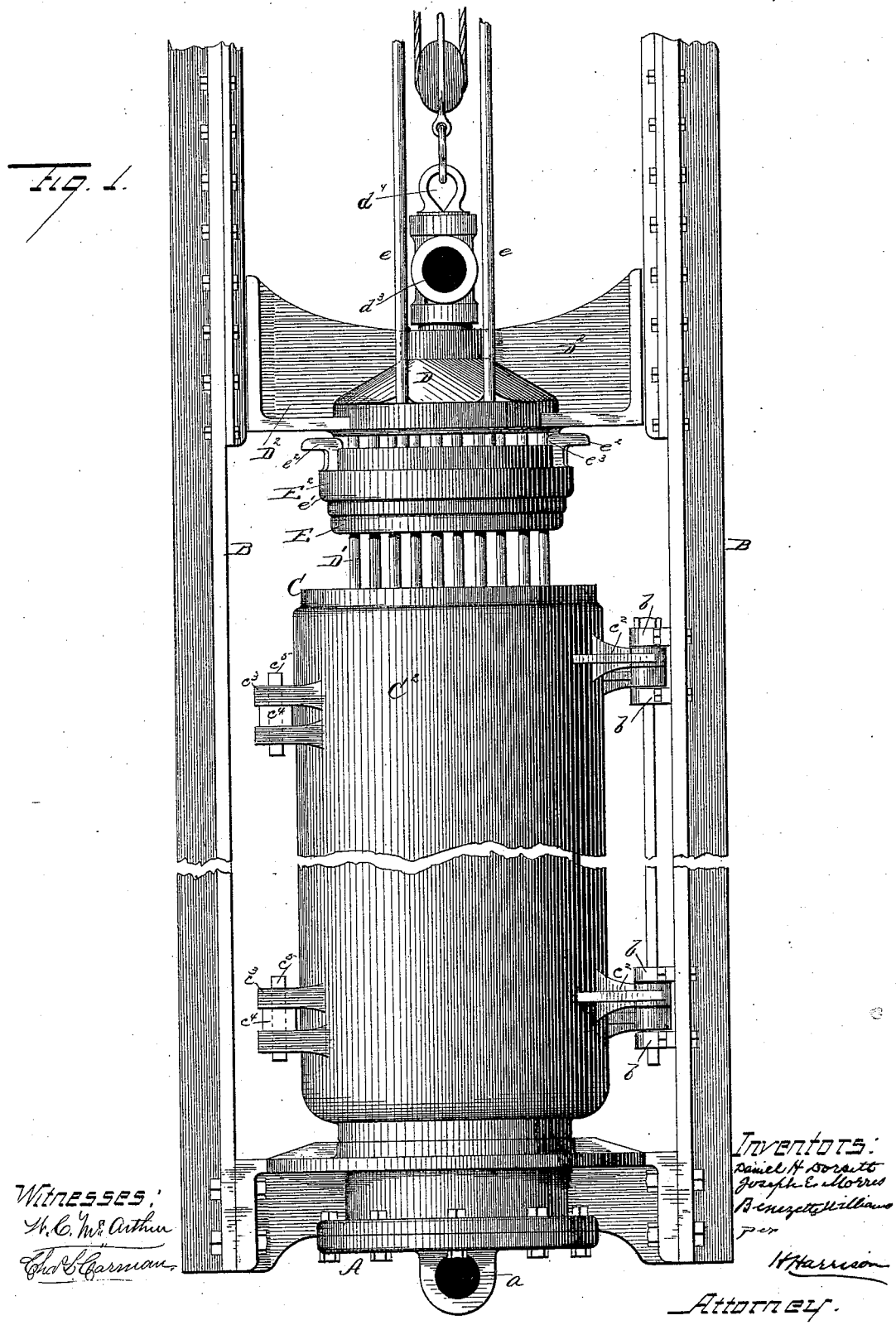

(No Model.) 6 Sheets—Sheet 2.
D. H. DORSETT, J. E. MORRIS & B. WILLIAMS.
APPARATUS FOR MOLDING THE SECTIONS OF ELECTRICAL CONDUITS.
No. 291,996. Patented Jan. 15, 1884.
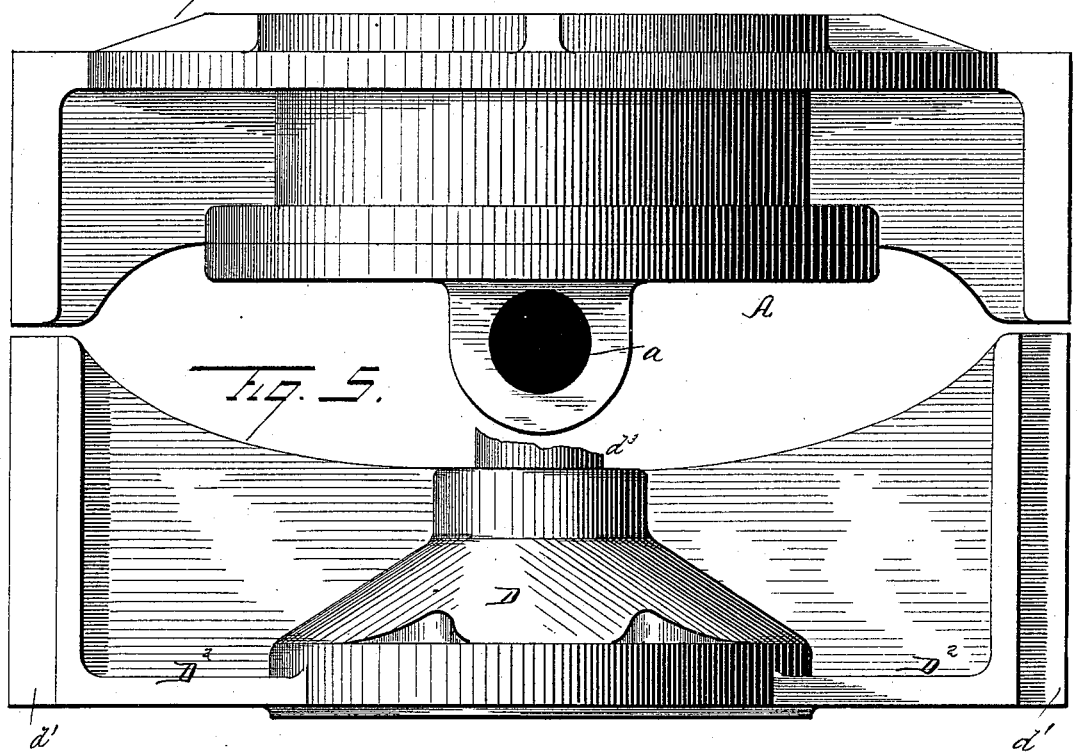
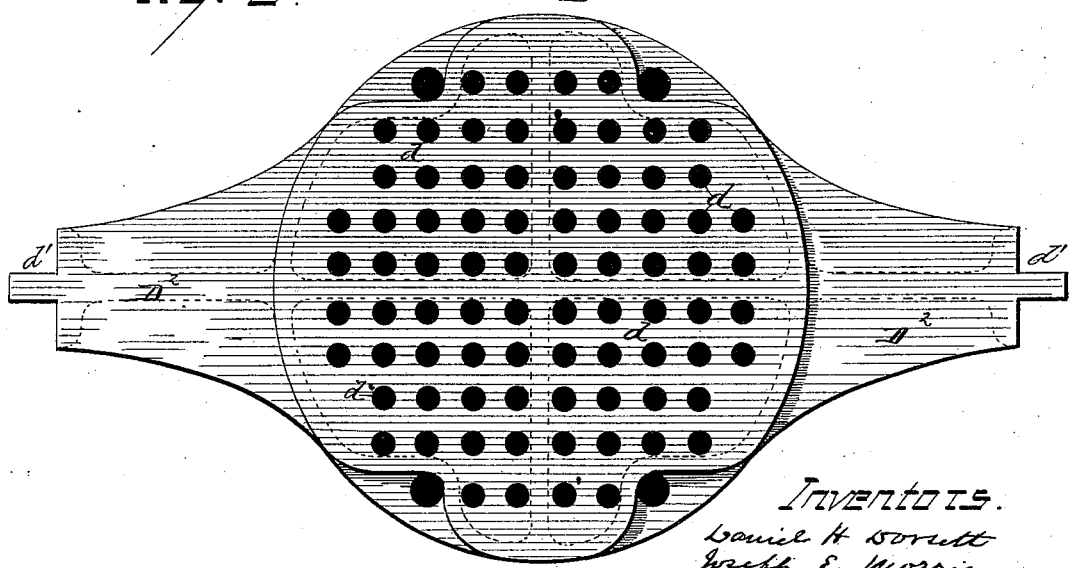
Witnesses:
Inventors.
Daniel H. Dorsett
Joseph E. Morris
Benjamin Williams
per H. Harrison
Attorney.

(No Model.) 6 Sheets—Sheet 3.
D. H. DORSETT, J. E. MORRIS & B. WILLIAMS.
APPARATUS FOR MOLDING THE SECTIONS OF ELECTRICAL CONDUITS.
No. 291,996. Patented Jan. 15, 1884.
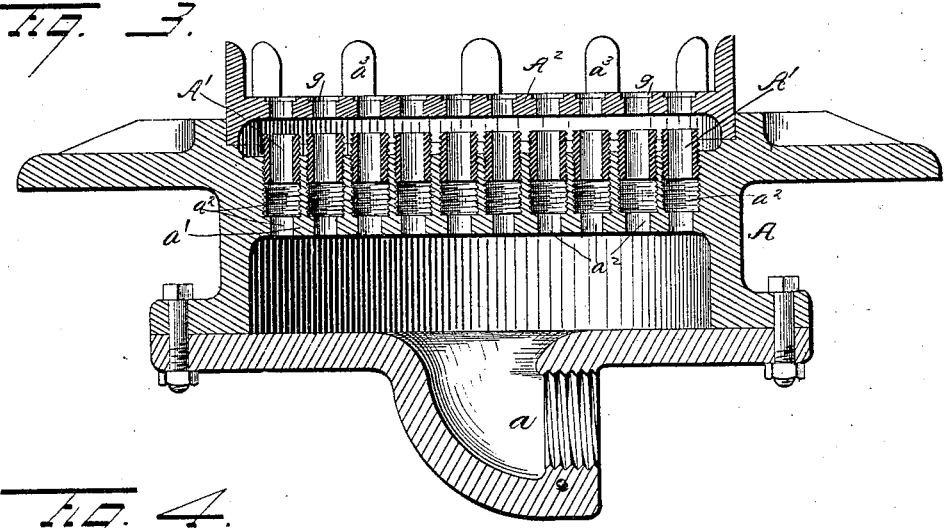
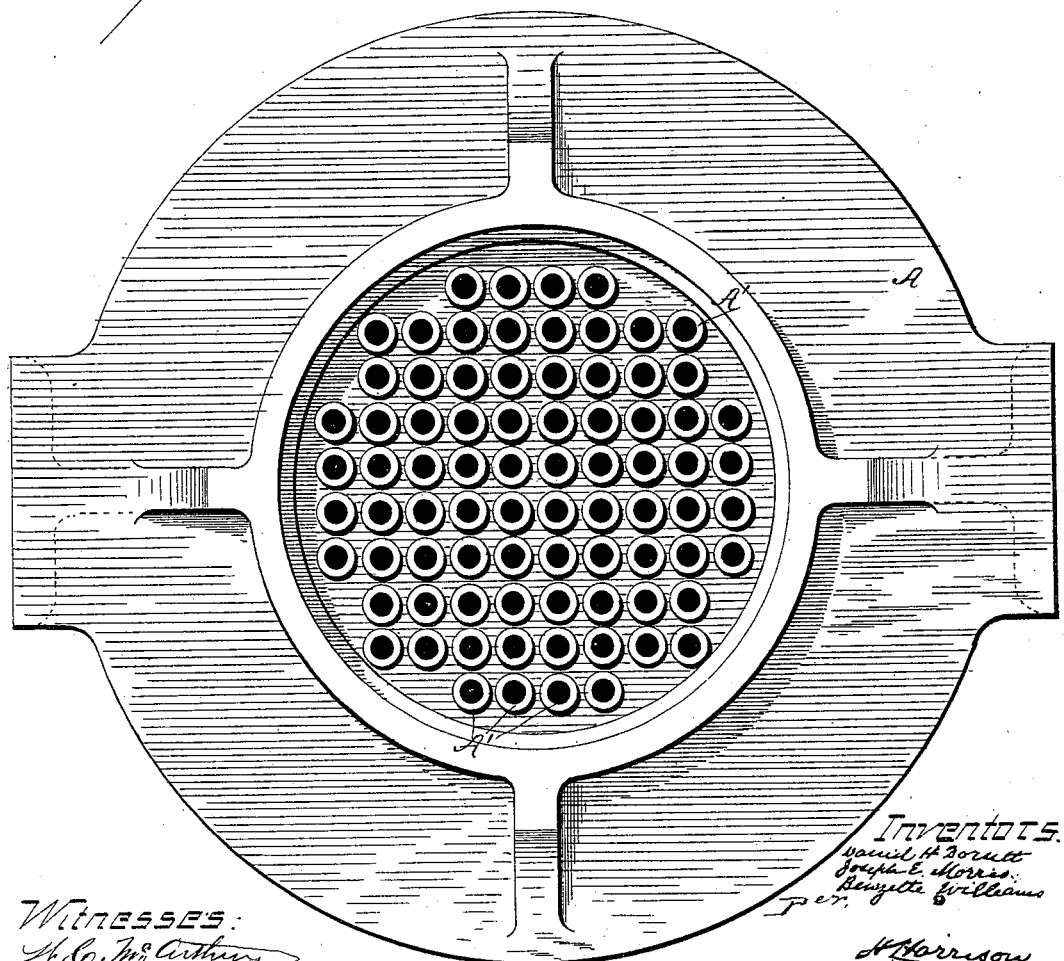

(No Model.) 6 Sheets—Sheet 4.
D. H. DORSETT, J. E. MORRIS & B. WILLIAMS.
APPARATUS FOR MOLDING THE SECTIONS OF ELECTRICAL CONDUITS.
No. 291,996. Patented Jan. 15, 1884.
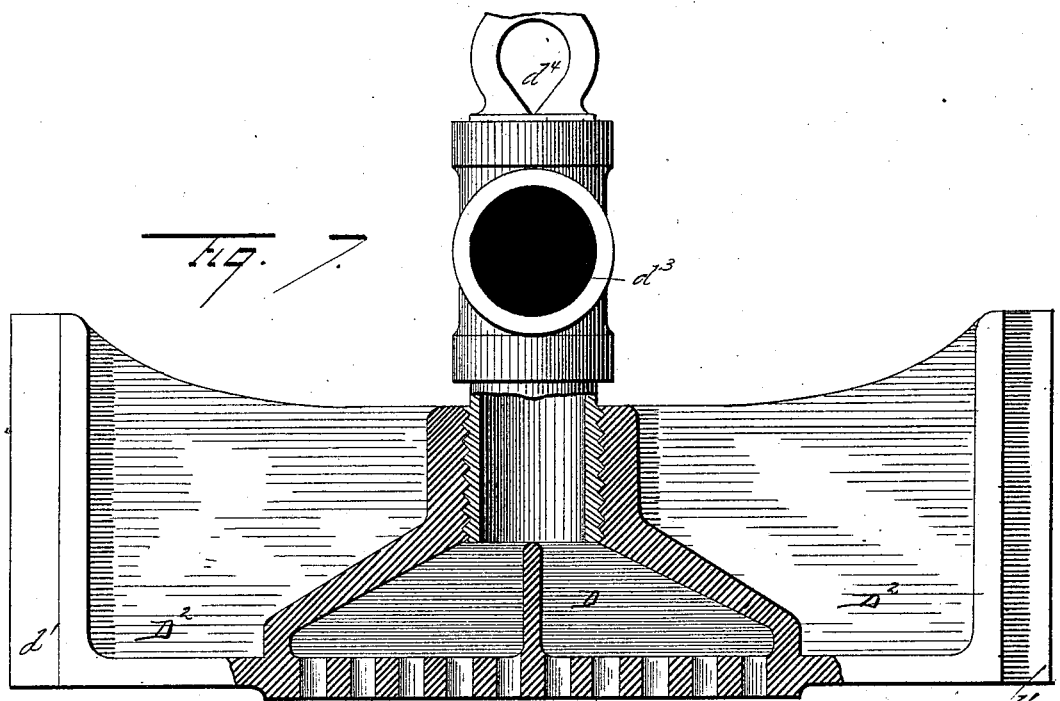
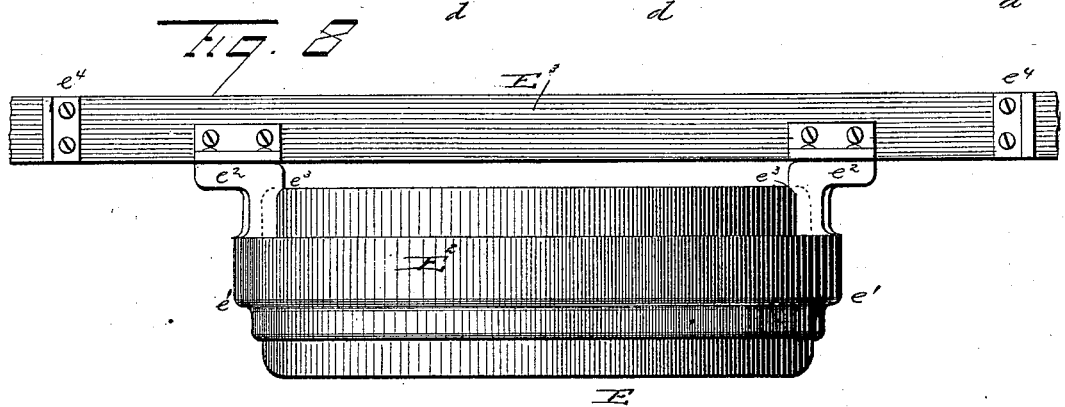
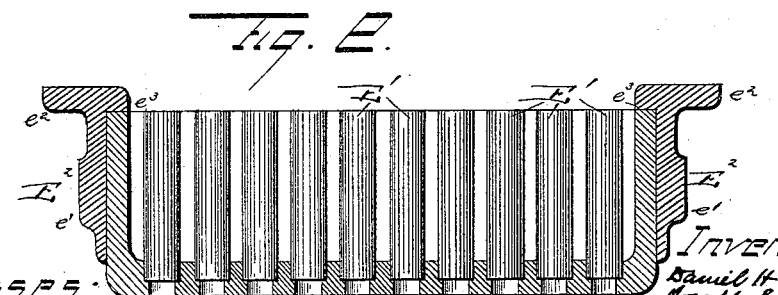

(No Model.) 6 Sheets—Sheet 5.
D. H. DORSETT, J. E. MORRIS & B. WILLIAMS.
APPARATUS FOR MOLDING THE SECTIONS OF ELECTRICAL CONDUITS.
No. 291,996. Patented Jan. 15, 1884.
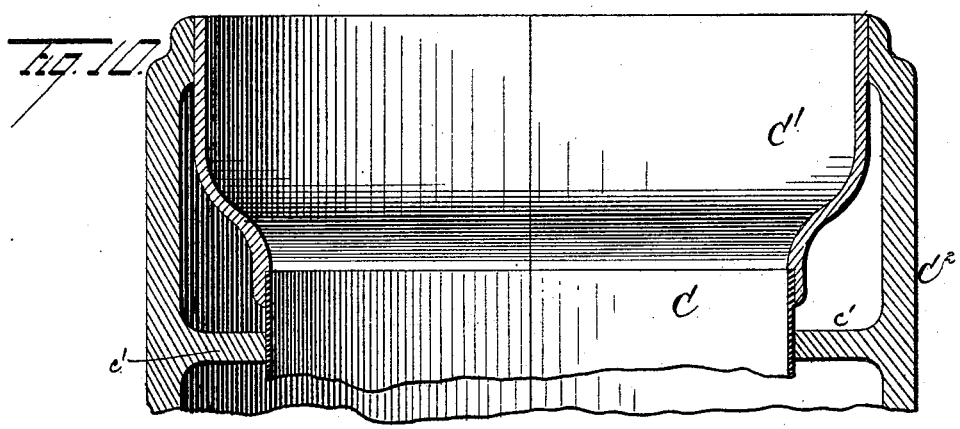
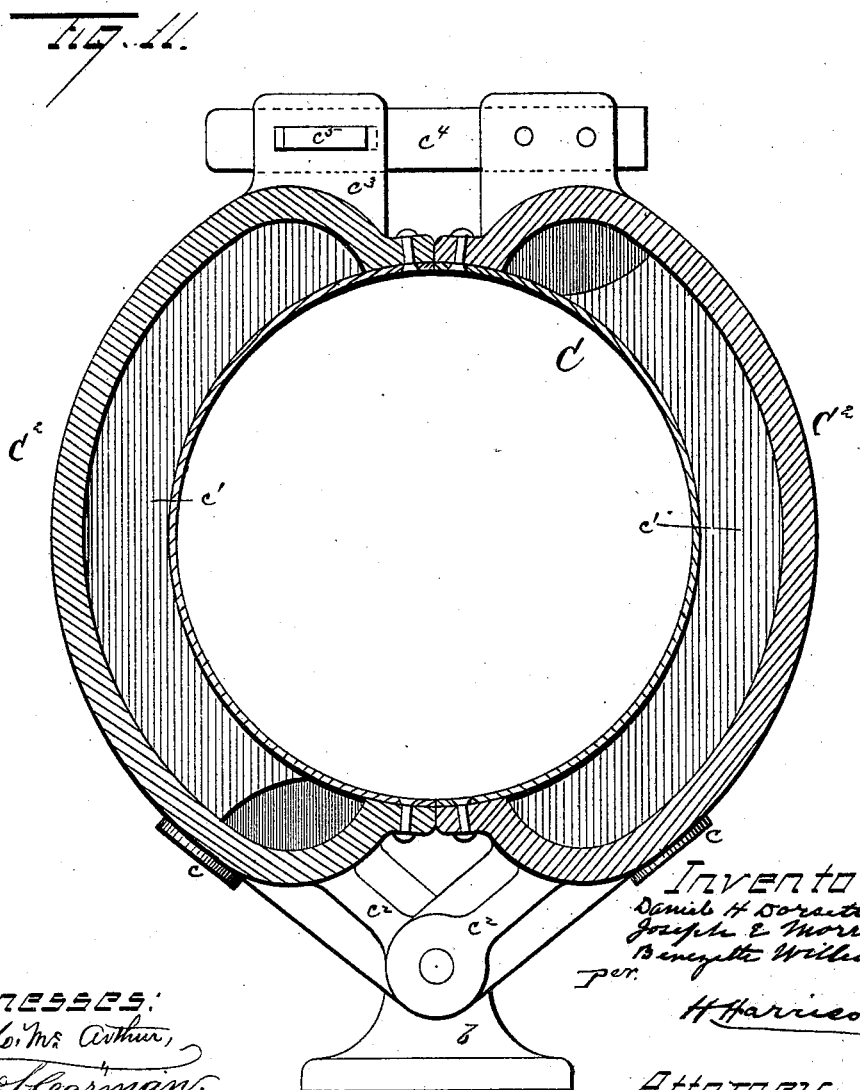

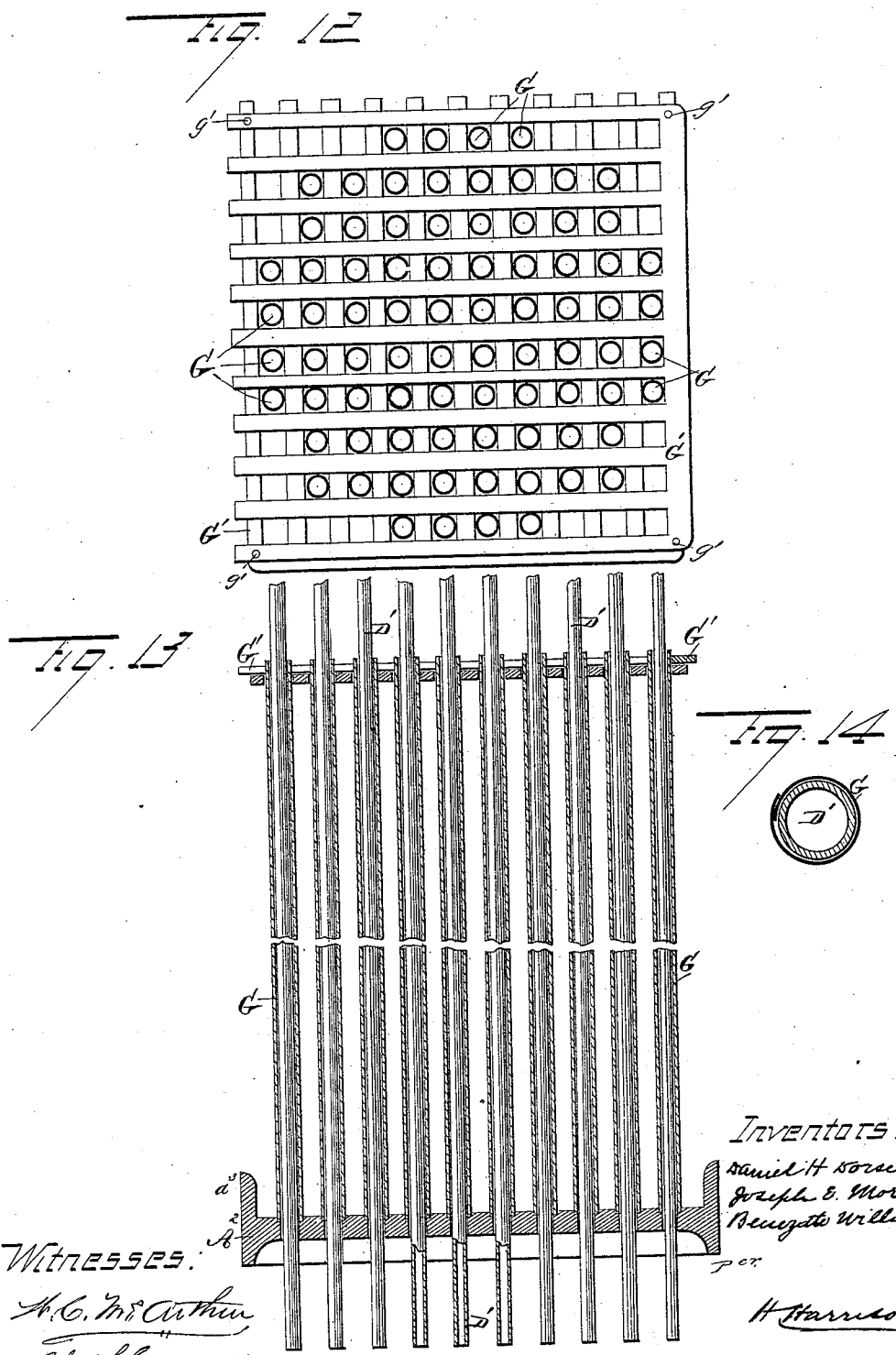

UNITED STATES PATENT OFFICE.

DANIEL H. DORSETT, JOSEPH E. MORRIS, AND BENEZETTE WILLIAMS, OF CHICAGO, ILLINOIS.

APPARATUS FOR MOLDING THE SECTIONS OF ELECTRICAL CONDUITS.

SPECIFICATION forming part of Letters Patent No. 291,996, dated January 15, 1884.

Application filed April 21, 1883. (No model.)

*To all whom it may concern:*

Be it known that we, DANIEL H. DORSETT, JOSEPH E. MORRIS, and BENEZETTE WILLIAMS, citizens of the United States, residing at Chicago, in the county of Cook and State of Illinois, have invented certain new and useful Improvements in the Apparatus for Molding the Sections for Electrical Conduits, of which the following is a specification, to wit:

This invention relates to an improvement in apparatus for molding the sections of electrical conduits; and it consists in the combination, with a hollow base forming a steam-chamber, and surmounted by a casing or mold having hollow walls and steam-connections, of a chambered head or follower carrying series of pipes forming cores, and adapted to be raised or lowered at will, substantially as will be hereinafter more fully set forth.

In order to enable others skilled in the art to which our invention appertains to make and use the same, we will now proceed to describe its construction and operation, referring to the accompanying drawings, in which—

Figure 1 is a side elevation of our invention; Fig. 2, an enlarged side view of the hollow base; Fig. 3, a central vertical section, and Fig. 4 a plan view, of the same. Fig. 5 is a side elevation of the upper steam-chamber; Fig. 6, a bottom view, and Fig. 7 a central section, of the same; Fig. 8, a side view, and Fig. 9 a cross-section of the bell-former; Fig. 10, a vertical section of the outer mold, and Fig. 11 a horizontal section of the same; Fig. 12, a plan view of the core-centering devices; Fig. 13, a vertical section of the same, and Fig. 14 an enlarged cross-section of one of the steam-pipes and its expanding shell.

A represents the base of the machine, which consists of a hollow chamber provided with an opening or connection, $a$, for steam or water pipes, and recessed or socketed in its upper side, which recess is divided from the chamber by a web of metal, $a'$, in which is formed a suitable number of sockets, $a^2$, and adapted to receive any suitable packing, and provided with screw-nipples $A'$, as shown by Fig. 3. These nipples are made hollow, and the web $a'$ is perforated below the packing-chamber, as represented.

Upon the upper side of the base A is set a base-plate, $A^2$, also perforated, to correspond with the nipples $A'$ and perforations $a'$ in the web. The base-plate is socketed into the upper face of the base, and projects above it sufficiently to center the outer mold when in proper position; and from the upper outer edge of the plate $A^2$ project a series of short lugs, $a^3$, the purpose of which will be presently described.

To each side of the base A are secured two upright lengths of angle-iron, B B, in such a manner as to leave a small space between them and form a frame extending upward a suitable height to inclose all the working parts of the apparatus.

The main or outer former or mold, C, is formed in two parts, and has a flaring bell-shaped flange, C', at its upper end, adapted to form a similar bell upon the end of a section of the conduit similar to that used upon ordinary sewer or gas mains for the reception of the smaller end of the next section. Each portion of the mold C is provided with a steam-jacket, $C^2$, having openings $c$ at top and bottom, for connection with the supply and exhaust pipes, and the space between the inner and outer walls of the steam-space is provided with horizontal ribs $c'$, having openings at alternate ends, in order that steam or water admitted at the top may be caused to circulate around the mold in a zigzag course and escape at the bottom. The two parts of the mold are each provided upon one side with lugs $c^2$, which are hinged between similar lugs, $b$, upon the angle-iron frame B. Upon the opposite edges these parts are formed, one with perforated lugs $c^3$ and the other with a perforated tongue, $c^4$, which, when the parts are brought together, passes between the lugs upon the opposite part, and are securely fastened by a wedge-key, $c^5$, as shown in the drawings.

D represents the upper steam-chamber, having its lower face formed with perforations $d$, corresponding in number and position with the openings in the base or lower chamber.

in these perforations are secured long tubes or steam-pipes D', which serve as cores for forming the cellular conduit-sections. This chamber is provided or formed with wings D², having vertical tongues d' upon their outer ends, adapted to slide vertically between guides b², secured to the uprights B of the main frame, and is also provided with a steam or water connection, d³, and an eye, d⁴, by which the head and its core-tubes are raised and lowered by means of a tackle secured to any convenient place above the apparatus or to the upper part of the frame.

Upon the core-tubes D', below the head, is placed the bell-former or core, consisting of a cup-shaped casting, E, provided with a number of short guide-tubes, E', socketed into the bottom of the cup through which the core-tubes pass. This casting or cup is supported and raised and lowered into proper position by means of rods e e, secured to the cup and passing upward through openings in the steam-head, as shown by Fig. 1, and provided with any suitable hoisting device at their upper ends.

Around the cup E is a ring, E², formed with an annular shoulder, e', near its lower edge, as clearly seen in Figs. 8 and 9, and formed with two arms, e², upon opposite sides, adapted to rest upon the upper edge of the main mold or outer shell, and also with small inner shoulders, e³, which rest upon the cup E and keep the ring in proper place.

Across the upper side of the bell-former E² is placed a bar, E³, secured to the arms e² of the ring in such a position as to pass freely between the core-tubes, and serving as a handle by which the ring may be lifted independent of the cup, or the two pressed down within the mold upon the material under operation. This bar is adapted to slide between and be guided by the uprights B of the frame upon each side, and is provided with guide-lugs e⁴, which serve to keep it from being twisted or from turning or twisting the bell-former.

In operation, the upper and lower steam-chambers and the two parts of the main mold being connected with supply and exhaust pipes, (preferably flexible pipes,) the main mold is closed and locked. The bell-former is now lowered until the ring catches and rests upon the outer shell of the mold, and the cup continues until it is at the bottom of the mold. The head with its pipes being lowered at the same time, the cup-casting E and its guide-tubes center the lower ends of the core-tubes D', and guide them through the openings in the base-plate. They then pass down through the nipples and packing-boxes into the lower steam-chamber, where they are held by securing the head or its hoisting device. The bell-former is now raised until far enough above the top of the mold to allow of easy access thereto, and the material of which the section is to be formed is poured in in a heated and liquid or plastic state. Steam, having been admitted to the upper steam-chamber or follower, passes down through the core-tubes into the lower chamber or base and off through the exhaust-connection, thereby keeping the interior of the mass of plastic material well heated, and prevents its setting or cooling until the mold is entirely filled and the casting finished. Steam is at the same time admitted to the upper end of the jacketed mold, and, circulating around the divisions, as described, escapes at the lower end for the same purpose. When the mold has been filled as far as the bell, the former E is dropped into place and the bell filled, and the section is then formed. The steam is now turned off of both mold and core pipes, and a stream of cold water passed through them, which soon sets or cools the material. The follower and bell-former are then lifted, and if the material should adhere to the core-tubes, it may readily be loosened by a current of steam sufficient to slightly heat and loosen them. The outer mold is then unlocked and thrown open, and the section or casting taken out and set aside, and the operation is repeated.

In some instances and with some compounds the application of the steam-jets may not be sufficient to loosen the core-tubes, and in this case we use the device shown in Figs. 12, 13, and 14. This consists of a series of tubes, G, formed of sheet metal, having its vertical edges overlapping, as shown by Fig. 14. These sheet-metal casings are placed with their lower ends in sockets g in the upper part of the perforations of the base-plate, and their upper ends are centered and held in position by two rack-frames, G', the arms of which cross each other at right angles, and are secured by pins g' at their corners. The core-tubes descending through these sheet-metal casings expand them to their proper form and hold them in place while the racks or centering devices are withdrawn. After the casting is made the core-tubes are easily withdrawn, and the sheet-metal casings then spring together and are readily removed without the necessity of using any steam or heat.

This device is especially adapted for the manufacture of conduit-sections of the kind and material for which we have an application for a patent now pending—that is, of an asphaltum compound; but it is evident that it may be used for other materials, and also that, if desired, the core-tubes may be dispensed with and solid rods used in their place, dispensing at the same time with the upper and lower steam-chambers, and, if wished, with the steam-jacket also; but we prefer to use the device as herein described.

It will be observed that the peculiar shape of the shouldered ring E² and its position upon the bell-former E forms the interior of the bell of the conduit-section with two interior annular shoulders. When the smaller end of a section is inserted in the bell of another, its end rests against the inner of these shoulders, leaving a space between this and the solid portion of the second section, while the first is held in proper position to have its cells register with those of the second by the outer shoulder, and beyond this there will be an annular space between the two sections. The small end of each section is also formed with a number of short longitudinal depressions by the projections $a^3$ upon the base-plate $A^2$. When the sections are laid, the end one is inserted in the bell of the other, as described, and the two are firmly cemented together, as described in our former application, before referred to, by pouring melted or liquid material into the space between the two sections through a hole in the side of the bell, formed by a core-lug upon the inside of the outer mold, thus forming the two sections into one continuous conduit. The annular space around the outer end part of the joint is then filled with plastic material, which penetrates the depressions formed by the base-plate and completes the joint in a perfectly solid manner.

Having thus fully described our invention, what we claim as new, and desire to secure by Letters Patent, is—

1. In an apparatus for casting cellular sections for underground electrical conduits, a vertically-sliding hollow or chambered head having an opening for the admission of steam or water, and provided with hollow cell-cores depending from its lower side, in combination with a perforated base-plate through which the cores are passed, substantially as shown and described.

2. In an apparatus for casting sections for underground electrical conduits, a base-plate upon which the section is cast, formed or provided with projections around its periphery, adapted to form longitudinal depressions in the end of the casting, substantially as and for the purpose set forth.

3. In an apparatus for casting cellular sections for underground electrical conduits, a hollow or chambered base having an escape-opening for water or steam, and a series of openings provided with stuffing-boxes, in combination with a series of hollow core-tubes adapted to pass through the stuffing-boxes and open into the hollow base, substantially as shown and described.

4. In an apparatus for casting sections for underground electrical conduits, the hollow base A, having its upper side chambered out, and provided with holes $a^2$, having nipples A' in them, and provided with an outlet, $a$, for steam and water, in combination with the base-plate $A^2$, recessed within the base, but projecting somewhat above it, and having openings corresponding to the nipples in the base and projections $a^3$ around its periphery, substantially as and for the purpose set forth.

5. In an apparatus for casting sections for underground electrical conduits, an outer mold formed in two parts, hinged to the main frame, and each part provided with a jacket or casing having inlet and outlet passages for steam or water, substantially as described and shown.

6. In an apparatus for casting sections for underground electrical conduits, an outer mold provided with a jacket or casing having inlet and outlet passages for steam or water, and a series of diversions between the mold and its jacket, having openings in alternate ends, whereby the steam or water is caused to circulate around the mold in its passage, substantially as shown and described.

7. In an apparatus for casting cellular sections for underground electrical conduits, the combination, with a mold and its base, and a series of cell-cores, of a bell-former through which the said cores are passed, and adapted to be dropped to the bottom of the mold when desired to clean or center the cores, substantially as described and shown.

8. In an apparatus for casting cellular sections for electrical conduits, a bell-former constructed in two independent parts, one within the other, the outer of which is adapted to form two annular shoulders upon the inner side of the cast section, substantially as shown and described.

9. In an apparatus for forming cellular sections for underground electrical conduits, the bell-former E, having holes or tubes E', adapted to slide upon the cell-cores, and supported by the rods $e\ e$, in combination with the shouldered ring $E^2$, having the arms $e^2$ and shoulders $e^3$, and the handle or bar $E^3$, substantially as and for the purpose set forth.

10. In an apparatus for casting cellular sections for underground electrical conduits, the combination, with a base having uprights upon each side, and a two-part mold hinged thereto, of a head adapted to slide vertically in said uprights, and having cell-cores depending therefrom, and provided with means for raising and lowering it, substantially as shown and described.

11. In an apparatus for forming cellular sections for underground electrical conduits, a casing for the cell-cores, formed of sheet metal, and adapted to fit closely around said cores when they are in the mold, but capable of being sprung together for removal, substantially as described and shown.

12. In an apparatus for forming cellular sections for underground electrical conduits, the combination of a series of open sheet-metal casings, adapted to fit around the cell-cores, with a base-plate formed with a series of socketed or shouldered openings, and a centering device composed of two racks or frames adapted to hold the casings in position while the cores are being lowered, substantially as described and shown.

13. An apparatus for casting cellular sections for underground electrical conduits, consisting, essentially, of the hollow base A, having the nipples A', packing-boxes $a^2$, and exhaust-opening $a$, and provided with the perforated base-plate $A^2$, having projections $a^3$, and the uprights B, in combination with the hollow head D, adapted to slide vertically in the uprights, and provided with the inlet $d^3$ and cell cores or tubes D', and the two-part bell-former E $E^2$, having tubes E', and jacketed two-part mold C, hinged to the uprights and having locking devices, all constructed and arranged to operate substantially as and for the purpose set forth.

In testimony whereof we affix our signatures in presence of two witnesses.

DANIEL H. DORSETT.
JOSEPH E. MORRIS.
BENEZETTE WILLIAMS.

Witnesses:
J. E. STEVENSON,
FRANK JOHNSON.